United States Patent [19]

Appleby

[11] 4,357,400
[45] Nov. 2, 1982

[54] PHOTOELECTROCHEMICAL CELL EMPLOYING DISCRETE SEMICONDUCTOR BODIES

[75] Inventor: Anthony J. Appleby, Mountain View, Calif.

[73] Assignee: Electric Power Research Institute, Inc., Palo Alto, Calif.

[21] Appl. No.: 205,617

[22] Filed: Nov. 10, 1980

Related U.S. Application Data

[63] Continuation-in-part of Ser. No. 102,560, Dec. 11, 1979, abandoned.

[51] Int. Cl.$^3$ .............................................. H01M 6/36
[52] U.S. Cl. .................................................. 429/111
[58] Field of Search ......................................... 429/111

[56] References Cited
U.S. PATENT DOCUMENTS

| | | | |
|---|---|---|---|
| 4,090,933 | 5/1978 | Nozik | 204/129 |
| 4,094,751 | 6/1978 | Nozik | 204/80 |
| 4,173,494 | 11/1979 | Johnson et al. | 136/250 |
| 4,315,973 | 2/1982 | Manassen et al. | 429/111 |

OTHER PUBLICATIONS

G. W. Murphy, "Model Systems in Photoelectrochemical Energy Conversion", *Solar Energy*, vol. 21, pp. 403-407 (1978).

*Primary Examiner*—Aaron Weisstuch
*Attorney, Agent, or Firm*—Flehr, Hohbach, Test, Albritton & Herbert

[57] ABSTRACT

A photovoltaic cell includes a substrate having two conductive layers thereon and a plurality of discrete semiconductor bodies positioned on the conductive layers. In one embodiment discrete silicon particles of one conductivity type are positioned on one conductive layer and discrete silicon particles of opposite conductivity type are positioned on the other conductive layer. A redox system electrolyte contacts the particles whereby a voltage potential is generated across the two conductive layers in response to photons impinging on the semiconductor particles. In an alternative embodiment, a plurality of spaced conductive layers are provided with both P type and N type silicon particles on each conductive layer. A redox electrolyte serially connects the bipolar cells of each conductive layer thereby providing a higher voltage potential. In making the devices, electrical potentials are applied to the conductive layers whereby charged silicon particles are attracted to selected conductive layers and repulsed by other conductive layers. The particles are affixed to the conductive layers by suitable finders or adhesives such as silicone resins.

11 Claims, 10 Drawing Figures

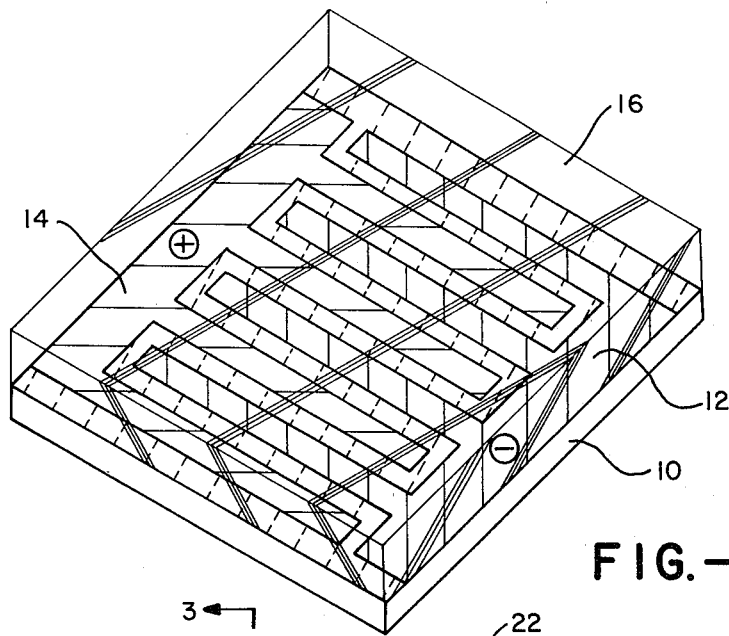
FIG.—1
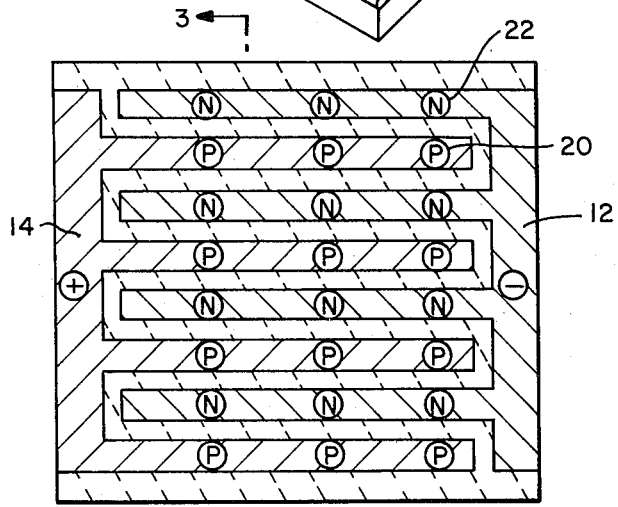
FIG.—2
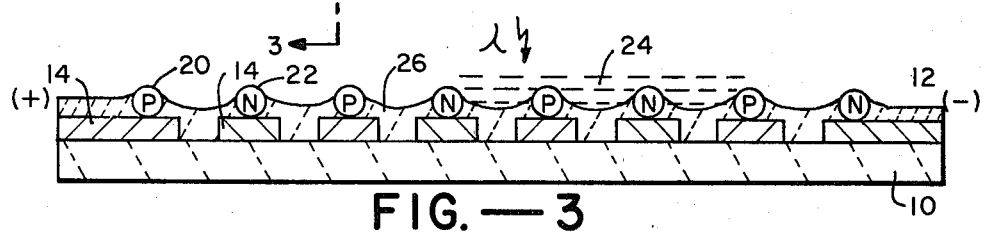
FIG.—3
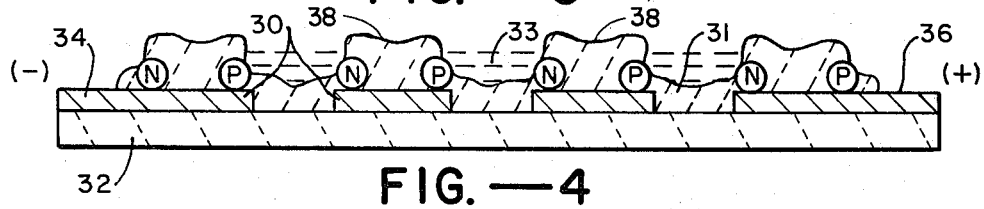
FIG.—4

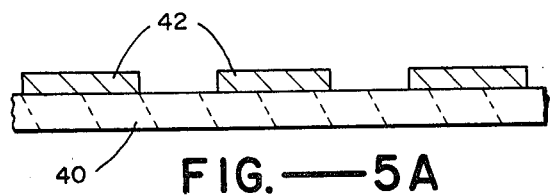
FIG.—5A
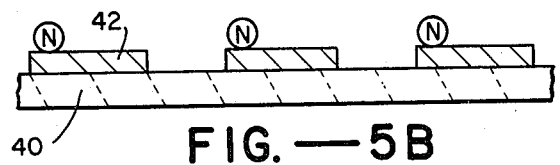
FIG.—5B
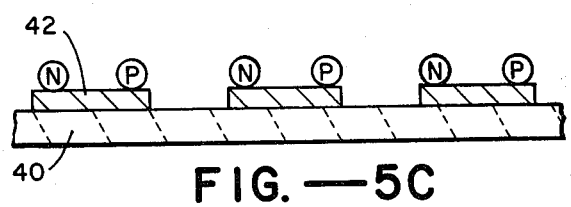
FIG.—5C
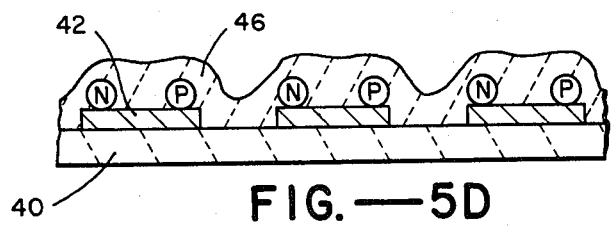
FIG.—5D
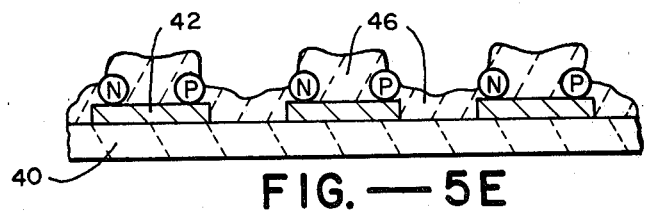
FIG.—5E
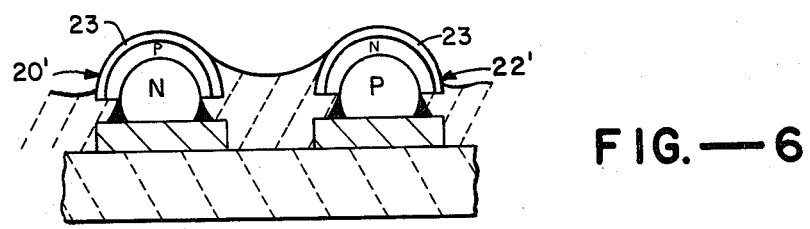
FIG.—6

PHOTOELECTROCHEMICAL CELL EMPLOYING DISCRETE SEMICONDUCTOR BODIES

This patent application is a continuation-in-part of copending application Ser. No. 102,560 filed Dec. 11, 1979, now abandoned.

This invention relates generally to semiconductor technology and devices, and more particularly the invention relates to semiconductor photovoltaic cells and methods of making same.

Semiconductor photovoltaic devices are known which respond to solar radiation and generate an electrical charge or current. The silicon cell as employed in solar batteries has a PN junction across which a voltage differential is developed in response to impinging photons. Heretofore, manufacturing costs of the silicon cell and the low conversion efficiency thereof have limited the utility of the silicon cell.

In recent years, the solar cell has been proposed for use in producing chemical energy rather than electrical energy. For example, such a cell may be in permanent contact with an electrolytic solution, and an electrical current generated by the solar cell and flowing through the electrolytic solution produces chemical products. The chemical products are typically in gaseous form, and the chemicals evolving from the solar cell can be captured for subsequent use in thermal conversion or in a fuel cell device where the chemicals are recombined to generate an electrical current. One of the earliest of such devices was described by Fujishima and Honda in *Bulletin of Chemical Society of Japan* 44, 1148 (1971) in which a semiconductor such as titanium oxide is coupled to a counter electrode such as platinum and responds to solar illumination by splitting water into hydrogen and oxygen.

U.S. Pat. No. 4,021,323 discloses a solar energy conversion system in which doped silicon beads are placed in contact with a solution whose decomposition potential is sufficiently low so that the solution can be efficiently photo-decomposed with the chemicals stored and later recombined in a fuel cell. Few materials are presently known which will work in such a structure, and the known materials such as hydriodic acid are very corrosive and difficult to handle.

Another electrochemical photo and solar cell has been proposed by Gerischer in *Journal of Electroanalytical Chemistry* 58,263 (1975) in which a photoelectrochemical cell produces electricity. In this structure an N type titanium oxide electrode is placed in contact with a redox electrolytic solution. The solution short circuits the titanium oxide electrode to a platinum counter electrode so that a photovoltage and current is developed across the counterelectrode and semiconductor.

An object of the present invention is an improved photovoltaic cell.

Another object of the invention is an electrochemical photovoltaic cell for directly producing electricity.

Another object of the invention is a method of fabricating a photovoltaic cell.

Briefly, in accordance with the invention a photovoltaic cell includes a substrate, a first conductive layer and a second conductive layer on a major surface of the substrate with the first and second conductive layers being interleaved.

An insulative material is provided over the two conductive layers with a first semiconductor material of one conductivity type positioned on and in contact with the first conductive layer, and a second semiconductor material of opposite conductivity type positioned on and in contact with the second conductive layer. An electrolytic solution overlays the major surface in contact with the first and second semiconductive material and the insulative material with the electrolytic solution defining a conductive path for transferring charge between the two semiconductor materials whereby a voltage potential is generated between the first and second semiconductive material.

A feature of the invention is the use of a plurality of discrete semiconductor bodies on the two conductive layers whereby radiation is transmitted through the electrolytic material into the semiconductor bodies.

In accordance with another feature of the invention, in fabricating the photovoltaic cell a voltage potential of one polarity is applied to the first conductive layer and a voltage potential of opposite polarity is applied to the second conductive layer. A charge of the opposite polarity is applied to semiconductor bodies of one conductivity type, and the bodies are then introduced to the conductive layers whereby the charged semiconductor bodies are attracted to the first conductive layer and repulsed by the second conductive layer. An adhesive is applied to the charged semiconductor spheres on the first conductive layer, or alternatively, the first conductive layer can be provided with an adhesive prior to the introduction of the semiconductor bodies to the conductive layers. Alternatively, other methods such as printing, including silk screen processing, can be employed.

The invention and objects and features thereof will be more readily apparent from the following detailed description and appended claims when taken with the drawing, in which:

FIG. 1 is a perspective view of one embodiment of a photovoltaic cell in accordance with the present invention.

FIG. 2 is a plan view of the photovoltaic cell of FIG. 1.

FIG. 3 is a side view in section of the photovoltaic cell of FIG. 2 taken along the line 3—3.

FIG. 4 is a side view in section of another embodiment of a photovoltaic cell in accordance with the invention.

FIGS. 5A–5E are section views illustrating the fabrication of the cell of FIG. 4.

FIG. 6 is a side view in section of another embodiment of a photocell in accordance with the invention.

Referring now to the drawings, FIG. 1 is a perspective view of one embodiment of a photovoltaic cell in accordance with the present invention. The device includes a substrate 10 of suitable electrically insulative material such as ceramic or glass having a major surface on which a first conductive layer 12 and a second conductive layer 14 are formed. The conductive layers may comprise a thin layer such as aluminum which is deposited on the surface of substrate 10 by sputtering, and thereafter through conventional photoresist masking and etching techniques the interleaved pattern of the conductive layers 12 and 14 is formed. In this embodiment the interleaved conductive layers 12 and 14 have interdigitated fingers; however it will be appreciated that other interleaved configurations such as concentric arcs, for example, could be employed. The top surface 14 of substrate 10 is encapsulated by a cover 16 which has a transparent top through which radiation can pass.

A first semiconductor material of one conductivity type is positioned on the layer 12, and a second semiconductor material of opposite conductivity type is positioned on the second conductive layer 14. The remaining exposed surfaces of the conductors are covered by a suitable dielectric. The semiconductor material and dielectric material are illustrated and described hereinbelow with reference to FIGS. 2-4. The space within cover 16 is filled with a suitable electrolytic solution in contact with the first and second semiconductor materials thereby electrically interconnecting the two semiconductor materials and whereby the semiconductor material, in response to impinging photons passing through the top of cover 16, generates a voltage differential as illustrated by the positive or "+" contact on layer 14 and the negative or "−" electrical contact on layer 12.

A suitable electrolytic solution for use in the device in accordance with the invention is a redox system such as an iron couple in which iron ions ($Fe^{++}$ and $Fe^{+++}$) provide the charge carriers between the two semiconductor materials. Such an electrolyte is known and may be in the class of organic compounds such as alcohol (ethanol), ketones (acetone), amides (acetamide), esters (acetates), ethers (tetrahydrofuran), complex cyclic compounds (propylene carbonate) and other similar materials of sufficient dielectric constant, stability, and power as solvents. In addition, low melting molten salts are applicable, for example, pyridinium salts or other materials with suitable anions and cations.

In accordance with a feature of the invention, the semiconductor material comprises a plurality of discrete silicon bodies which may be generally spherically shaped (e.g. 100 micron or less in diameter). FIG. 2 is a plan view of the devices of FIG. 1 in which the P type spheres 20 and the N types spheres 22 are positioned on conductive layers 14, and 12, respectively. The spherically shaped bodies can be formed by permitting droplets of molten silicon to fall through a sufficient distance (e.g. eight feet) whereby the droplets solidify. Such a process is described in U.S. Pat. No. 4,021,323, supra. Each sphere has a dopant concentration on the order of $10^{17}$–$10^{19}$ atoms per cubic centimeter of a suitable dopant such as boron for P type silicon and phosphorus for N type silicon.

In accordance with another aspect of the invention the spheres are selectively applied to the conductive layer using conventional electrophoretic deposition techniques. The semiconductor spheres of one conductivity type, such as the P type spheres 20, are positioned on conductive layer 14 by applying a voltage potential of one polarity to conductive layer 14, and a voltage potential of opposite polarity may be applied to conductive layer 12. For example, a suitable positive voltage can be applied to conductive layer 14 and a negative voltage is applied to conductive layer 12. A negative charge is established on the P type spheres 20, and the charged spheres are then introduced to the metal layers. The charged particles may be suspended in a solution, and the substrate with proper voltage bias on the conductive layers is then placed in the solution. The negative potential on layer 12 repulses the negatively charged spheres 20 while the positive potential on conductive layer 14 attracts the negatively charged particles 20 whereby the P type spheres are deposited on conductive layer 14.

The metal layers can be initially covered by a suitable dielectric such as glass or an epoxy. By selective photomasking and chemical etching of the dielectric the surface of the metal layers can be exposed. The semiconductor spheres are then deposited on the exposed surfaces.

After the positioning of the P type particles 20 on layer 14, the N type particles 22 are applied to conductive layer 12 by a similar process whereby the charged particles are attracted to the conductive layer 12.

FIG. 3 is a side view in section of the device taken along the line 3—3 in FIG. 2. As illustrated, the interleaved conductive layers 12 and 14 with the N type spheres and P type spheres, respectively, positioned thereon receive radiation and the electrolytic solution 24 between spheres provides an ion charge transfer system with a resulting voltage potential developed between the conductive layers 12 and 14, as illustrated. In a redox system employing $Fe^{++}$ and $Fe^{+++}$ ions, the $Fe^{++}$ ions migrate to and are oxidized by the N type semiconductor material 22, and the resulting $Fe^{+++}$ ions migrate to and are reduced at the P type semiconductor material 20. The dielectric layer 26 covers the conductive layers 12 and 14 whereby the electrolytic solution 24 does not contact the conductive layers 12 and 14.

The device as illustrated in FIGS. 2 and 3 is a monopolar array wherein the potentials and currents from a multitude of single elements are collected in parallel so that a large current at a unit cell voltage results. Alternatively, a bipolar array can be employed in which a large number of low current single cells are connected in series so that a high voltage, low current array results. FIG. 4 is a side view in section similar to FIG. 3 and illustrates such a bipolar array. In this embodiment a plurality of spaced parallel electrically conductive layers 30 are formed on a surface of a substrate 32 with dielectric 31 covering the conductive layer edges and dielectric 38 covering the conductive layer surfaces. Each conductive layer is provided with both N type and P type semiconductor spheres as illustrated. The electrolyte 33 is provided between the P and N type semiconductor spheres of the bipolar cells, and the metal layers 30 serially connect the bipolar cells with the cumulative voltage appearing across plus terminal 34 and negative terminal 36.

Fabrication of the bipolar array of FIG. 4 is similar to the fabrication of the array in FIGS. 2 and 3 using photoresist masking and etching techniques to define parallel spaced conductive layers on the surface of a glass or other suitable substrate 32 and then applying suitable bias potentials to the metal layer to attract charged semiconductor bodies. The N type spheres are positioned on a first plurality of conductive layers, and the P type spheres are positioned on the second plurality of conductive layers which are interleaved with the first plurality of conductive layers. Thereafter, adjacent conductive layers are joined by vacuum deposited metal bridges to form the larger conductive layers 30, as illustrated. Alternatively, individual N and P silicon bodies may be formed by selective doping and etching of a silicon fiber and an underlying metal layer on a support substrate. A suitable dielectric material 38 such as a glass is provided over the spheres on each conductive layer 30, as shown.

FIGS. 5A–5G illustrate use of a printing method in fabricating the cells of FIG. 4. In FIG. 5A, a portion of a substrate 40 and conductors 42 are illustrated. In FIGS. 5B and 5C the N and P type particles are applied by silk screening and fused to the surface of the conductors. In fusing the particles, each of the particles can be provided with a metal layer (for example, plated nickel or copper) prior to placement on the conductors 42, and the metal layers are fused to the conductors. Alternatively, the particles can be attached by electroplating after placement on the conductors.

Thereafter, as shown in FIG. 5D a glass layer 46 is applied over the structure and thermally fused to the particles and conductors. In FIG. 5E, a glass etchant is applied to reduce the thickness of the layer 46 and reveal the semiconductor particles. If any metal is on the exposed semiconductor surfaces, a suitable etchant is applied to remove the metal.

Rather than using particles of only one conductivity type, metal coated n-p and p-n particles can be employed. Such particles are disclosed in U.S. Pat. No. 4,136,436. FIG. 6 is a section view of a portion of a cell similar to the embodiment of FIG. 3 but in which particle 20' includes outer P type material over an N type core, and particle 22' includes outer N type material over a P type core. A layer 23 of a suitable metal which is stable and transparent to light such as platinum covers the surfaces of the particles. This cell provides a higher output voltage (e.g. 1.1 volts for an open circuit silicon cell) than the cell of FIG. 3.

Photovoltaic cells in accordance with the present invention can be utilized in low cost, utility oriented power systems. Since chemical decomposition is not employed, chemical storage means and fuel cell utilization means are not required. The use of discrete, doped semiconductor bodies increase the electrical capability of the photovoltaic device and is readily fabricated.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A photovoltaic cell comprising
   an insulative substrate,
   a first conductive layer and a second conductive layer on a major surface of said substrate, said first and second conductive layers being interleaved,
   a first semiconductor material comprising a plurality of discrete bodies of one conductivity type positioned on said first conductive layer,
   a second semiconductor material comprising a plurality of discrete bodies of opposite conductivity type positioned on said second conductive layer,
   an electrically insulative layer overlying said major surface and said first and second conductive layers with said first and second semiconductor materials selectively exposed through said insulative material,
   an electrolytic solution overlaying said major surface and in contact with said first and second semiconductor materials, and
   means enclosing said electrolytic solution through which light can pass and impinge on said first and second semiconductor material.

2. A photovoltaic cell as defined by claim 1 wherein said electrolytic solution comprises a redox system.

3. A photovoltaic cell as defined by claim 1 wherein said discrete bodies are generally spherically shaped.

4. A photovoltaic cell as defined by claim 1 wherein said one conductivity type is P type and said opposite conductivity type is N type, and further including a positive electrical contact to said first conductive layer and a negative electrical contact to said second conductive layer.

5. A photovoltaic cell array comprising
   an insulative substrate,
   a plurality of conductive layers on a major surface of said substrate, said plurality of conductive layers being in spaced, generally parallel alignment,
   a first semiconductive material of one conductivity type and a second semiconductor material of opposite conductivity type positioned on each of said conductive layers,
   an electrically insulative layer overlying said major surface and said first and second conductive layers with said first and second semiconductor materials being selectively exposed through said insulative material,
   an electrolytic solution in the regions overlaying said surface between said conductive layers and in contact with said first and second semiconductor materials, and
   transparent cover means enclosing said electrolytic solution and through which light can pass and impinge on said first and second semiconductor material, said cover means confining said electrolytic solution to said regions overlaying said surface between said conductive layers.

6. A photovoltaic cell as defined by claim 5 wherein the first and second semiconductor materials comprise a plurality of discrete bodies.

7. A photovoltaic cell as defined by claim 5 or 6 wherein said electrolytic solution comprises a redox system.

8. A photovoltaic cell as defined by claim 6 wherein said discrete bodies are generally spherically shaped.

9. A photovoltaic cell as defined by claim 5 and further including a positive electrical contact and a negative electrical contact, said plurality of conductive layers and said first and second semiconductor material thereon being serially connected between said positive electrical contact and said negative electrical contact.

10. A photovoltaic cell comprising
    an insulative substrate,
    a first conductive layer and a second conductive layer on a major surface of said substrate, said first and second conductive layers being interleaved,
    a first semiconductor material comprising a plurality of first discrete bodies positioned on said first conductive layer, each of said first discrete bodies having a core material of first conductivity type, an outer layer of material of second conductivity type and a stable metallized surface which is transparent to light, said core material contacting said first conductive layer,
    a second semiconductor material comprising a plurality of second discrete bodies positioned on said second conductor layer, each of said second discrete bodies having a core material of said second conductivity type, an outer layer of material of said first conductivity type, and a stable metallized surface, said core material contacting said second conductive layer,
    an electrically insulative layer overlying said major surface and said first and second conductive layers with said stable metallized surfaces exposed through said insulative material, an electrolytic solution overlaying said major surface and in contact wih said stable metallized surfaces of said first and second semiconductor materials, and means enclosing said electrolytic solution through which light can pass and impinge on said first and second semiconductor materials.

11. A photovoltaic cell as defined by claim 10 wherein said electrolytic solution comprises a redox system.

* * * * *